United States Patent
Glass

(10) Patent No.: US 6,409,200 B1
(45) Date of Patent: Jun. 25, 2002

(54) VISUAL ALIGNMENT AID FOR CONNECTING TRAILERS

(75) Inventor: James L. Glass, 103 Doral Cir., Naples, FL (US) 34113

(73) Assignee: James L. Glass, Naples, FL (US)

( * ) Notice: Subject to any disclaimer, the term of this patent is extended or adjusted under 35 U.S.C. 154(b) by 0 days.

(21) Appl. No.: 09/756,517

(22) Filed: Jan. 9, 2001

(51) Int. Cl.[7] .............................................. G02B 7/182
(52) U.S. Cl. ........................ 280/477; 280/432; 224/309
(58) Field of Search ................................ 280/477, 432; 359/841; 224/309–331, 400–499; 248/467, 474, 476, 479, 495, 480; 33/264

(56) References Cited

U.S. PATENT DOCUMENTS

| | | | | |
|---|---|---|---|---|
| 1,430,379 A | * | 9/1922 | Hubbell | |
| 4,163,606 A | * | 8/1979 | Granno | 350/307 |
| 4,469,405 A | * | 9/1984 | Chin-Wun | 350/302 |
| 5,292,045 A | * | 3/1994 | Mandel | 224/309 |
| 5,482,310 A | * | 1/1996 | Staggs | 280/477 |
| 6,102,423 A | * | 8/2000 | Beck et al. | 280/477 |
| 6,239,926 B1 | * | 5/2001 | De Shazer | 359/841 |
| 6,254,305 B1 | * | 7/2001 | Taylor | 403/378 |

\* cited by examiner

*Primary Examiner*—Avraham Lerner
*Assistant Examiner*—Tony Winner

(57) ABSTRACT

A visual alignment aid device for visually aiding a driver of a towing vehicle to align the ball on the towing vehicle with a socket on the tongue of a trailer. The device includes an elongated tubular member having a telescoping tubular member therein for extending the length of the tubular member. the telescoping member can be arrested in any length and rotational position. The tubular member can be attached to a vehicle by way of magnets or suction cups. An end of the telescoping member has a curved arm attached thereto by way of a clamping hinge. An end of the curved arm has a short arm attached thereto by way of another clamping hinge. The end of the short arm has a convex mirror attached thereto by way of a friction ball swivel.

6 Claims, 2 Drawing Sheets

VISUAL ALIGNMENT AID FOR CONNECTING TRAILERS

Cross Reference to Related Application (none)
Statement Regarding Fed Sponsored R & D (none)
Reference to Microfiche Appendix (none)

BACKGROUND OF THE INVENTION

The present invention pertains to a visual aid device for aiding a driver of a towing vehicle when connecting a trailer. In particular, the visual aid device helps in aligning the ball of a hitch of a towing vehicle relative to the socket on the tongue of the trailer by using an adjustable convex mirror on the alignment device which is removably attached to the towing vehicle. The aid device can easily be folded into a compact configuration for easy storage.

DESCRIPTION OF THE PRIOR ART

Various devices have been designed to visually facilitate connecting a towing vehicle to a trailer. Most of the devices involve a mirror and therefore, are considered visual aids permitting the driver a direct visual observation of the alignment of the ball of the hitch on the towing vehicle relative to the socket on the tongue of the trailer.

U.S. Pat. No. 5,180,182 discloses such a device. It consists of three parts which are hingedly connected to each other at their respective edges. Two side parts are notched at their edges and support a convex mirror attached to the third part in a position which is normal to the line of vision of a person attempting to align the towing vehicle and the trailer. The notches are provided so that the assembled device can be mounted on the edge of a tail gate of a pickup truck. It also allows the trailer hitch alignment device to be mounted on the edge of a partially raised rear window of a vehicle so equipped. The device can be collapsed into a compact configuration for easy storage by folding the three parts on top of each other. The above described device can only be attached to a towing vehicle having an edge available for mounting but could not be mounted on a flat surface horizontally or vertically.

U.S. Pat. No. 4,905,376 discloses another device providing a visual aid when connecting a towing vehicle to a trailer. This device is of a much more complicated construction in that it involves clamps to be attached to the tail gate of a pickup truck. A convex mirror is attached to carrying bars and is frictionally mounted between the spring clamps. The mirror itself is movably mounted on the bars. There is no disclosure that this device can be mounted on any other type of towing vehicle. This same patent discloses another device providing a visual aid when connecting a towing vehicle to a trailer. This device uses the same complicated structure except that instead of spring clamps it uses magnets to attach the device to the trunk lid of a passenger vehicle.

U.S. Pat. No. 5,309,289 discloses a further visual aid device for connecting a towing vehicle to a trailer. This device is not to be mounted on a towing vehicle at all but is permanently attached to the tongue of the trailer itself. This not the object of this invention.

BRIEF SUMMARY AND OBJECTS OF THE INVENTION

One object of the invention is to construct a very simple but effective and versatile device that can be constructed at a low cost. Another object of the invention is to simplify the initial mounting of the visual aid device on a vehicle no matter what type of a vehicle is involved or what size or dimension. An elongated bar has either spaced apart suction cups or magnets located on the bar that will attach the bar to either a flat or a curved surface or spaced apart surfaces such as are found on a pickup truck. The convex mirror then is oriented so that the driver can see the ball which is mounted on the hitch at the rear end of the vehicle.

DETAILED DESCRIPTION OF THE INVENTION

Figure 1:
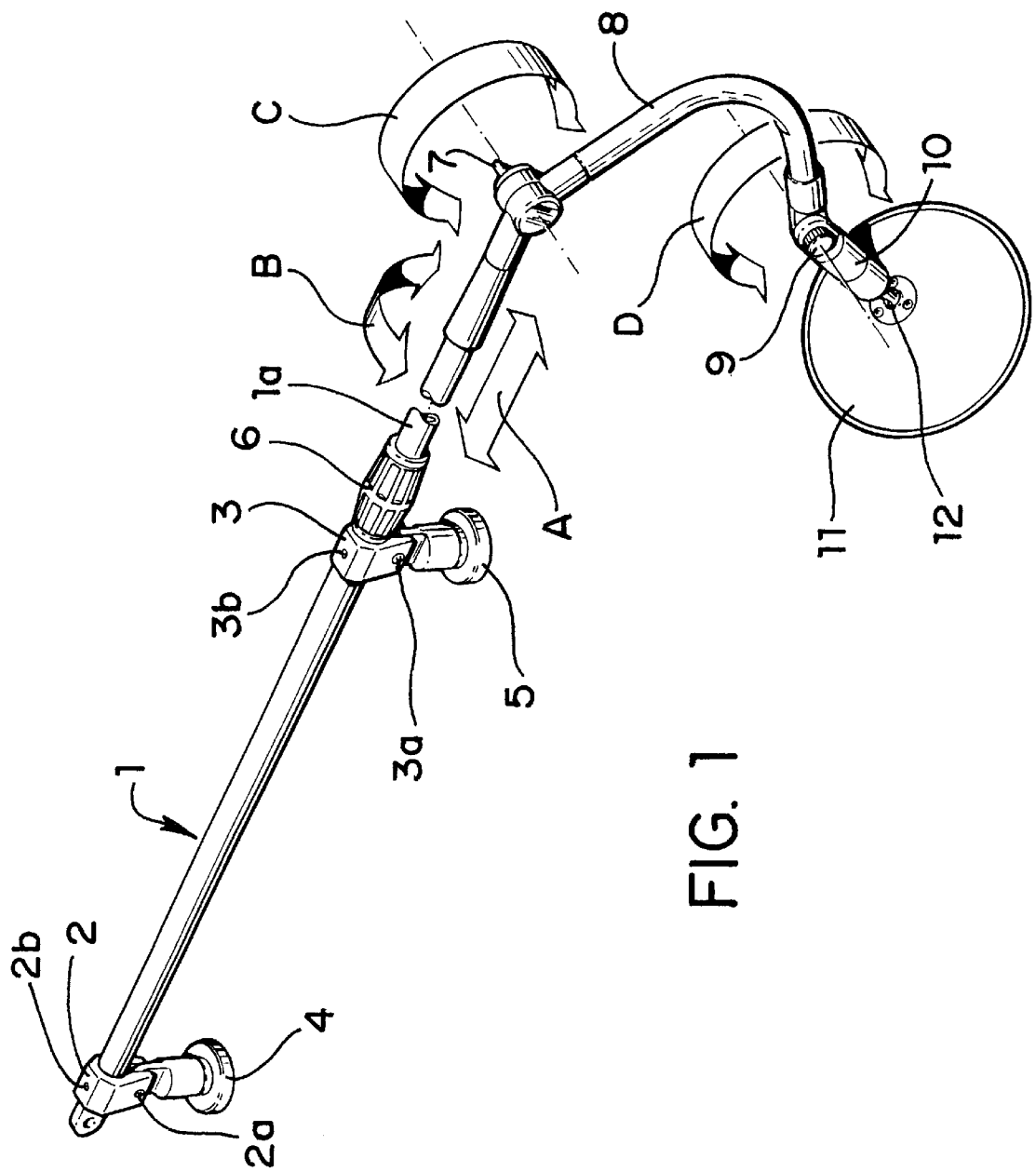
FIG. 1 shows a perspective view of the structure of the visual aid device by itself.

In FIG. 1 the visual aid device is shown in a perspective view. The basic support is a tubular member 1 which can be made of different materials with aluminum being preferred. The tubular member or tube is being supported on a vehicle by way of two stanchions 2 and 3, respectively, having clamping members 2a and 3a, respectively. The clamping members 2a and 3a can be moved to different positions along the tubular members as is dictated by the type of vehicle on which the visual aid device is to be installed. The stanchions 2 and 3 can also be mounted along the tubular member 1 by way of set screws 2b and 3b, respectively, in a more permanent manner. Below the stanchions 2 and 3 there are shown the mounting members 4 and 5 which will mount the visual aid device to the towing vehicle. The mounting members 4 and 5 can either be magnets or suction cups depending on the vehicle to which the visual aid device is to be mounted. A vinyl roof, for example, obviously will not lend itself to suction cups because it is not a smooth surface. However, the metal roof under the vinyl will be instrumental in attracting the magnets. However smooth metal roofs or trunk lids will easily accept the magnets. At the same time the suction cups will do just as well. It is contemplated and suggested that the support members 4 and 5 be made interchangeable with the stanchions 2 and 3 and could be included with the visual aid device at the point of sale. The tubular support member 1 can be extended to a greater length by a tubular telescoping member 1a which slides within the tubular member 1 as is shown by the arrow A. The telescoping tubular member 1a can be arrested relative to the tubular member 1 in a predetermined position by way of the compression fitting 6. The telescoping tubular member 1a can also be rotated relative to the tubular member 1 as is illustrated by the arrow B the position of which again is controlled by the compression fitting 6. At the forward end of the tubular member 1a, a curved arm 8 is attached by way of the clamping pivot hinge 7. This pivot hinge 7 allows the curved arm 8 to pivot up and down or sideways depending on the rotational position of the tubular member 1 as is shown by the arrow C. At the lower end of the curved arm 8, a short arm 10 is attached by way of another clamping hinge 9 which allows the short arm to pivot relative to the curved arm 8 in the same plane as is shown by the arrow D. Finally, at the lower end of the short arm 10 a convex mirror 11 is attached. The convex mirror 11 can be rotated and swiveled in a multiple of directions because of the use of a friction ball swivel 12.

Figure 2:
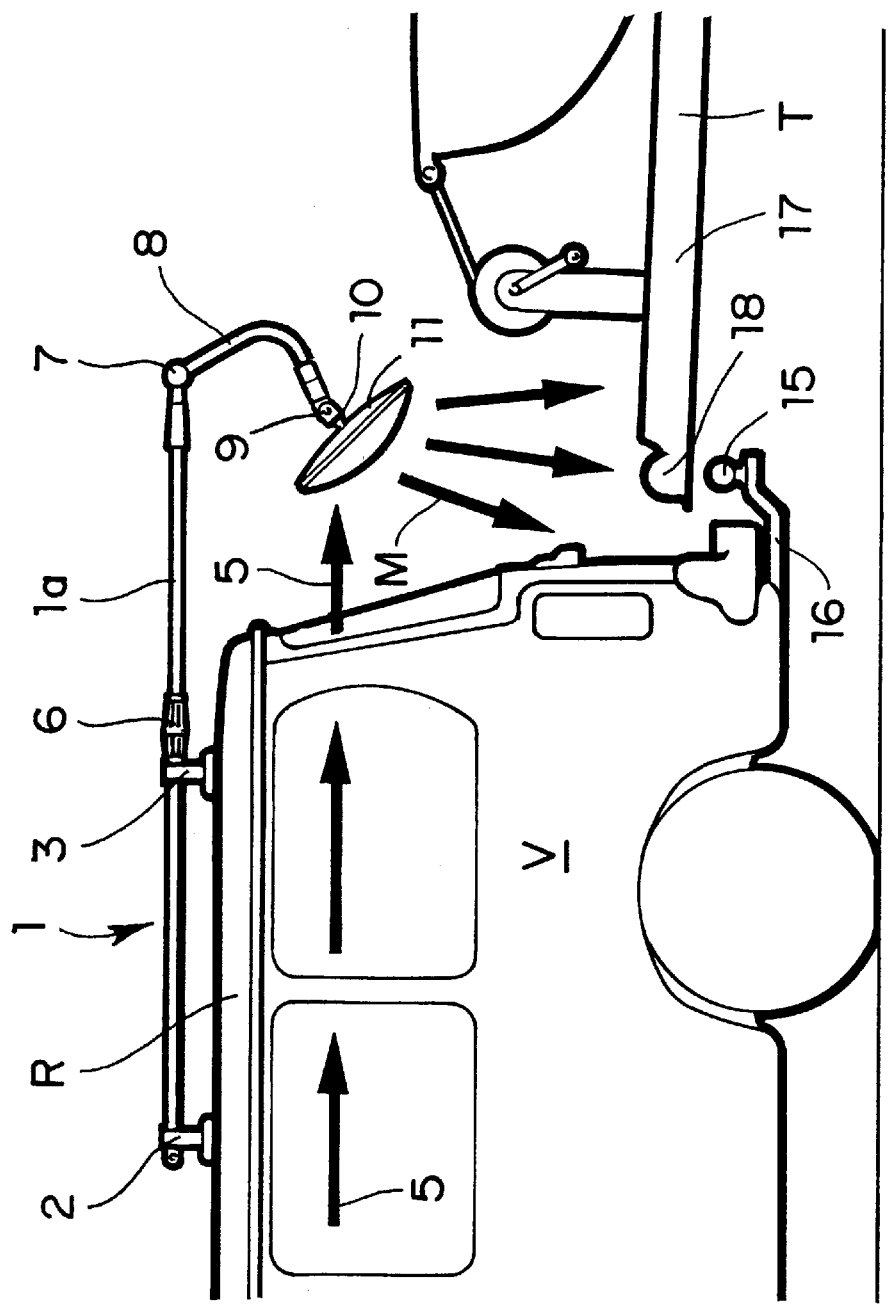
FIG. 2 illustrates the device of FIG. 1 stalled on a vehicle

Turning now to FIG. 2 which shows the visual aid device installed on a vehicle. The same reference characters have been used as in FIG. 1 to identify the same elements and no further explanation is deemed to be necessary to gain an understanding of FIG. 2. The vehicle in FIG. 2 is a van V having a rear window or two rear doors which meet in the middle of the rear of the van. The van can also be an SUV. In either case there is a roof R of metal which can easily attract the magnets 4 and 5. In this illustration the telescoping tubular member 1a has been extended in length from the tubular member 1 and is then fixed in place by the compression fitting 6. The curved arm 8 has been fixed in place by the clamping hinge 7 and the short arm has been fixed in its proper location by the clamping hinge 9. Finally, the convex mirror has been swiveled into a correct position by way of the friction ball swivel 12. Once everything is properly aligned, the driver of the towing vehicle can now view the ball 15 of the hitch 16 and the inverted socket 18 for the ball 15. The socket 18 is mounted on the tongue 17 of the trailer T. The approaching line up of the ball 15 and the socket 18 can easily be viewed by the driver of the towing vehicle when it is backing up by way of the sight lines S to the convex mirror which spreads out the sight lines to a larger viewing area as is represented by the diverging sight lines M. When the ball 15 is directly lined up under the socket 18, which can easily be observed by the driver of the towing vehicle, the task is accomplished.

SUMMARY OF THE INVENTION

It can now be seen that the visual aid device is quite effective in lining up a towing vehicle with a trailer to be towed. The device can be used on many different types of vehicles. In the illustration shown a connection has been made a van or an SUV. On a regular passenger car, the device would be mounted on the trunk lid of the vehicle or on the roof. On a convertible top vehicle, there are always metal cross bars available to which the magnets will be attracted. If the longitudinal tubular member 1 is not perfectly aligned, the various swivels and the rotation of the telescoping tubular member 1a can easily compensate for the various misalignments. The is true when using a pickup truck where no flat surface is available. One of the magnets 4 or 5 could placed on top of the tail gate and the other on top of the side wall or on top of the wheel well. Any misalignment can be overcome by the other movable elements described above. Another advantage of the visual aid device can be found when trying to align a panel truck (any size) to a trailer to be towed. All panel trucks have metal sides and either the suction cups or the magnets can be attached to a side of the truck and the adjustability of the visual aid device allows the driver of the towing truck to view the ball 15 of the hitch 16 and the socket 18 of the tongue 17. This can be accomplished by the driver either looking backward through an open window or by using the side mirror of the truck to view the convex mirror which of course is trained on the ball of the hitch. Vans are known to have two back doors forming a column in the middle of the rear end. The alignment device of the invention can easily overcome this problem because it does not have to mounted centrally of the vehicle.

What I claim is:

1. A visual alignment aid device for connecting a towing vehicle having a ball on a hitch to a trailer having a ball receiving socket on a tongue, said visual aid device consisting of an elongated tubular member having a sliding telescoping tubular member therein, said telescoping tubular member is a means for extending the length of said tubular member, said tubular member having means thereon for arresting said telescoping tubular member at a predetermined length and rotational position relative to said tubular member, said tubular member having means thereon for horizontally mounting said visual alignment aid device on a roof of a towing vehicle, an end of said telescoping member having a movable and curved arm attached thereto by way of an adjustable clamp hinge, an end of said curved arm having a movable short arm attached thereto by way of another adjustable clamp hinge, a convex mirror is attached to an end of said short arm, means for swiveling said convex mirror in a multiple of different directions.

2. The visual aid device of claim 1, wherein said means for mounting said tubular member to a vehicle includes two spaced apart stanchions clampingly mounted on said tubular member, each of said stanchions having means thereon for attaching to a vehicle.

3. The visual aid device of claim 2, wherein said means for attaching to a vehicle on said stanchions is a magnet on each of said stanchions.

4. The visual aid device of claim 2, wherein said means for attaching to a vehicle on said stanchions is a suction cup on each of said stanchions.

5. The visual aid device of claim 1, wherein said means for arresting on said tubular member is a compression fitting.

6. The visual aid device of claim 1, wherein said means for swiveling said convex mirror is a friction ball swivel mounted on a back of said mirror being in contact with said end of said short arm.

* * * * *